(12) United States Patent
Yu et al.

(10) Patent No.: US 10,587,880 B2
(45) Date of Patent: Mar. 10, 2020

(54) ZERO BLOCK DETECTION USING ADAPTIVE RATE MODEL

(71) Applicant: QUALCOMM Incorporated, San Diego, CA (US)

(72) Inventors: Yang Yu, San Diego, CA (US); In Suk Chong, San Diego, CA (US); Xianglin Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 15/940,349

(22) Filed: Mar. 29, 2018

(65) Prior Publication Data

US 2018/0288419 A1 Oct. 4, 2018

Related U.S. Application Data

(60) Provisional application No. 62/478,924, filed on Mar. 30, 2017.

(51) Int. Cl.
*H04N 19/147* (2014.01)
*H04N 19/14* (2014.01)
(Continued)

(52) U.S. Cl.
CPC ......... *H04N 19/147* (2014.11); *H04N 19/124* (2014.11); *H04N 19/132* (2014.11);
(Continued)

(58) Field of Classification Search
None
See application file for complete search history.

(56) References Cited

U.S. PATENT DOCUMENTS 7,606,427 B2 10/2009 Malayath et al.
2002/0141498 A1 10/2002 Martins et al.
(Continued)

FOREIGN PATENT DOCUMENTS

EP 0892555 A2 1/1999
WO 2012045041 A1 4/2012

OTHER PUBLICATIONS

Bross et al., "High efficiency Video Coding (HEVC) text specification draft 10 (for FDIS & Last Call)," 12th Meeting: Geneva, CH, Jan. 14-23, 2013 (Joint Collaborative Team on Video Coding of ISO/IEC JTC1/SC29/WG11 and ITU-T SG.16); JCTVC-L1003_v34, Mar. 19, 2013, 310 pp.

(Continued)

*Primary Examiner* — Talha M Nawaz
(74) *Attorney, Agent, or Firm* — Shumaker & Sieffert, P.A.

(57) ABSTRACT

A video coding device may be configured to estimate, based on a combination of a first parameter and a number of non-zero coefficients in a frame, a number of bits for non-zero coefficients of the frame, to encode the frame based on the estimated number of bits for the non-zero coefficients, to collect an actual number of bits used to encode the non-zero coefficients of the frame and an actual number of the non-zero coefficients in the frame, to update, based on the actual number of bits used to encode the non-zero coefficients of the frame and the actual number of non-zero coefficients in the frame, only the first parameter to form an updated first parameter, to form a rate estimation model using the updated first parameter and a second parameter, and to select, based on the rate estimation model, a coding mode for each block in the frame.

18 Claims, 9 Drawing Sheets

(51) Int. Cl.
  *H04N 19/194* (2014.01)
  *H04N 19/64* (2014.01)
  *H04N 19/176* (2014.01)
  *H04N 19/124* (2014.01)
  *H04N 19/172* (2014.01)
  *H04N 19/149* (2014.01)
  *H04N 19/132* (2014.01)

(52) U.S. Cl.
  CPC ......... *H04N 19/14* (2014.11); *H04N 19/149* (2014.11); *H04N 19/172* (2014.11); *H04N 19/176* (2014.11); *H04N 19/194* (2014.11); *H04N 19/647* (2014.11)

(56) References Cited

U.S. PATENT DOCUMENTS

| | | | |
|---|---|---|---|
| 2008/0069232 A1 | 3/2008 | Kondo et al. | |
| 2008/0112481 A1* | 5/2008 | Hsaing | H04N 19/50 375/240.03 |
| 2011/0002381 A1* | 1/2011 | Yang | H04N 19/172 375/240.03 |
| 2015/0208072 A1 | 7/2015 | Chen | |
| 2016/0007023 A1 | 1/2016 | Novotny | |
| 2017/0085892 A1* | 3/2017 | Liu | H04N 19/11 |
| 2018/0288420 A1 | 10/2018 | Yu et al. | |

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

ITU-T H.223, Series H: Audiovisual and Multimedia Systems, Infrastructure of audiovisual services—Transmission multiplexing and synchronization, Multiplexing protocol for low bit rate multimedia communication, The International Telecommunication Union, Jul. 2001, 74 pp.

U.S. Appl. No. 15/977,590, filed by Yang Yu, filed May 11, 2018.

U.S. Appl. No. 15/940,393, filed by Yang Yu, filed Mar. 29, 2018.

International Search Report and Written Opinion—PCT/US2018/025479—ISA/EPO—dated Jun. 18, 2018.

Sarwer M G., et al., "Fast Bit Rate Estimation for Mode Decision of 11.264/AVC," IEEE Transactions on Circuits and Systems for Video Technology, Institute of Electrical and Electronics Engineers, USA, vol. 17, No. 10, Oct. 1, 2007 (Oct. 1, 2007), pp. 1402-1407, XP011193123, ISSN: 1051-8215, DOI: 10.1109/TCSVT.2007.903787.

International Preliminary Report on Patentability—PCT/US2018/025479, The International Bureau of WIPO—Geneva, Switzerland, dated Oct. 10, 2019.

Non-Final Office Action from U.S. Appl. No. 15/940,393 dated Jul. 23, 2019, 14 pp.

Response to Non-Final Office Action filed on Oct. 23, 2019 for U.S. Appl. No. 15/940,393, dated Jul. 23, 2019, 14 pp.

* cited by examiner

ZERO BLOCK DETECTION USING ADAPTIVE RATE MODEL

This application claims the benefit of U.S. Provisional Patent Application 62/478,924, filed 30 Mar. 2017, the entire content of which is incorporated by reference.

TECHNICAL FIELD

This disclosure relates to video encoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as CTUs, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques for zero block detection using an adaptive rate model. Often, video frames are highly correlated temporally, especially in sceneries such as video telephony (VT) and video surveillance. This means the prediction error (residual) is usually very small. Encoding techniques may employ a model to decide whether to zero out a transform unit (TU) or not based on a rate distortion (RD) cost. Techniques of the current disclosure adaptively select parameters a and b of a rate estimation model so that when a video sequence has a lot of noise, a better coding efficiency may be achieved. Techniques of the current disclosure may also improve the rate estimation model for $R_{coef}$ to include consideration of coefficient positions so that the estimated number of bits is a function of rate estimation parameters (a and b), a number of non-zero coefficients in a block (nnz), and coefficient positions (pos). Here, $R_{coef}$ represents the number of bits used to code transform coefficients.

In one example of the disclosure, a method for encoding video data includes estimating, based on a combination of a first parameter and a number of non-zero coefficients in a frame, a number of bits used by non-zero coefficients of a frame, encoding the frame based on the estimated number of bits for the non-zero coefficients of the frame, collecting an actual number of bits used to encode the non-zero coefficients of the frame, collecting an actual number of the non-zero coefficients in the frame, updating, based on the actual number of bits used to encode the non-zero coefficients of the frame and the actual number of non-zero coefficients in the frame, only the first parameter to form an updated first parameter, forming a rate estimation model using the updated first parameter and a second parameter, and selecting, based on the rate estimation model, a coding mode for each block in the frame.

In another example of this disclosure, a video encoding device includes a video data memory storing video data and processing circuitry in communication with the video data memory. The processing circuitry is configured to estimate, based on a combination of a first parameter and a number of non-zero coefficients in a frame, a number of bits used by non-zero coefficients of a frame, encode the frame based on the estimated number of bits for the non-zero coefficients of the frame, collect an actual number of bits used to encode the non-zero coefficients of the frame, collect an actual number of the non-zero coefficients in the frame, update, based on the actual number of bits used to encode the non-zero coefficients of the frame and the actual number of non-zero coefficients in the frame, only the first parameter to form an updated first parameter, form a rate estimation model using the updated first parameter and a second parameter, and select, based on the rate estimation model, a coding mode for each block in the frame.

In another example of this disclosure, an apparatus for encoding video data includes means for estimating, based on a combination of a first parameter and a number of non-zero coefficients in a frame, a number of bits used by non-zero coefficients of a frame, means for encoding the frame based on the estimated number of bits for the non-zero coefficients of the frame, means for collecting an actual number of bits used to encode the non-zero coefficients of the frame, means for collecting an actual number of the non-zero coefficients in the frame, means for updating, based on the actual number of bits used to encode the non-zero coefficients of the frame and the actual number of non-zero coefficients in the frame, only the first parameter to form an updated first parameter, means for forming a rate estimation model using the updated first parameter and a second parameter, and means for selecting, based on the rate estimation model, a coding mode for each block in the frame.

In another example of this disclosure, a non-transitory computer-readable storage medium is encoded with instructions that, when executed, cause one or more processors of a video encoding device to estimate, based on a combination of a first parameter and a number of non-zero coefficients in a frame of video data, a number of bits for non-zero coefficients of the frame, to encode the frame based on the estimated number of bits for the non-zero coefficients of the frame, to collect an actual number of bits used to encode the non-zero coefficients of the frame, to collect an actual number of the non-zero coefficients in the frame, to update, based on the actual number of bits used to encode the non-zero coefficients of the frame and the actual number of non-zero coefficients in the frame, only the first parameter to form an updated first parameter, to form a rate estimation model using the updated first parameter and a second parameter, and to select, based on the rate estimation model, a coding mode for each block in the frame.

In one example of this disclosure, a method for encoding video data includes determining an amount of movement in a frame included in a sequence of frames, selecting a parameter set for a rate estimation model based on the determined amount of movement in the frame, and encoding the frame based on the rate estimation model.

In another example of this disclosure, a video encoding device includes a video data memory configured to store video data and processing circuitry in communication with the video data memory. The processing circuitry is configured to determine an amount of movement in a frame included in a sequence of frames, to select a parameter set for a rate estimation model based on the determined amount of movement in the frame, and to encode the frame based on the rate estimation model.

In another example of this disclosure, an apparatus for encoding video data includes means for determining an amount of movement in a frame included in a sequence of frames, means for selecting a parameter set for a rate estimation model based on the determined amount of movement in the frame, and means for encoding the frame based on the rate estimation model.

In another example of this disclosure, a non-transitory computer-readable storage medium is encoded with instructions that, when executed, cause one or more processors of a video encoding device to determine an amount of movement in a frame included in a sequence of frames, to select a parameter set for a rate estimation model based on the determined amount of movement in the frame, and to encode the frame based on the rate estimation model.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
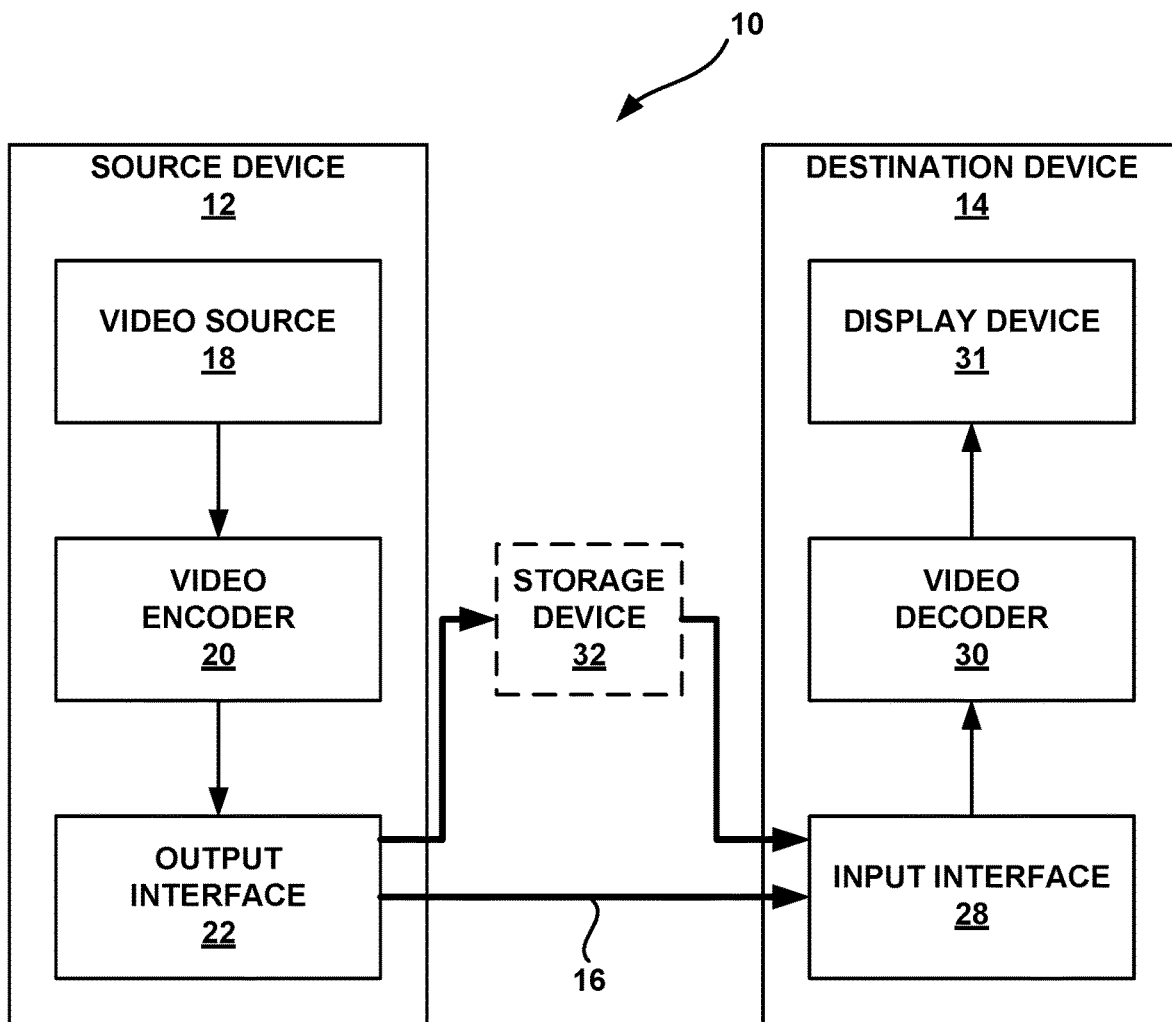
FIG. 1 is a block diagram illustrating an example video encoding and decoding system that may implement the techniques described in this disclosure.

A block-based hybrid video coding framework is widely used in video coding standards, such as MPEG-2, H.264/Advanced Video Coding (AVC), and High Efficiency Video Coding (HEVC), and others. For example, according to HEVC, a video encoder divides a video frame into blocks of different sizes called coding units (CUs). The video encoder may further split each CU into smaller blocks as prediction units (PUs) for prediction and/or transform units (TUs) for transform. The video encoder may predict each PU either within the current frame in the case of intra mode, or from reference frame(s) (e.g., temporally neighboring frame(s)) in the case of inter mode. The video encoder may transform, quantize, and encode a residual (also referred to as "prediction error") using entropy coding techniques, such as Context Adaptive Binary Arithmetic Coding (CABAC). In accordance with the techniques of this disclosure, the video encoder may achieve high coding efficiency by zeroing out blocks using an adaptive rate model. The video encoder may be a hardware encoder or may encode using various other techniques, e.g., software. Examples of video encoders configured according to the techniques of this disclosure are described in further detail below, with reference to the drawings.

In some aspects, this disclosure describes techniques for bit rate control in a video encoding process. To achieve higher coding efficiency, video coding standards such as H.264/AVC and HEVC use Lagrangian rate distortion optimization to determine an optimal mode, on a per-block basis, for encoding each coding block. Specifically, a video encoder may, for every mode in a selection set, calculate a rate distortion (RD) cost. In turn, the video encoder may choose the mode with the minimum RD cost as the final "optimal" mode with respect to the particular block. To achieve higher coding efficiency, video encoders (such as an HEVC video encoder) may selectively zero out some blocks by optimizing rate distortion cost. That is, a video encoder may change all transform coefficient values in one or more selected block(s) to zero. The video encoder may use a linear model to estimate a number of bits needed to signal coefficients of one block, using non-zero coefficients in the block. The parameters used in the linear model are fixed through configuration.

This disclosure describes techniques and device configurations for adaptively deciding a rate estimation model. In some examples, a video encoder of this disclosure may select the rate estimation model based on whether a current frame includes more or less than a threshold amount of motion, as compared to a previous frame. In these and other examples, a video encoder of this disclosure may update one of the parameters used in the rate estimation model used for a given frame, based on the actual number of bits to be used to encode non-zero coefficients of the frame and the actual number of non-zero coefficients in the frame. In these examples of this disclosure, such a revised rate estimation model (also referred to herein as an "adaptive" rate model or adaptive rate estimation model) may improve the coding efficiency of video sequences, such as when encoding noisy camera sequences such as internet protocol (IP) camera sequences. In some examples involving IP camera sequences, the average Bjøntegaard-Delta (BD)-rate is shown to improve by approximately 7% when the encoding techniques are enhanced using one or more aspects of this disclosure.

FIG. 1 is a block diagram illustrating an example video encoding and decoding system 10 that may utilize the adaptive rate model for zero block detection techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 32. Similarly, encoded data may be accessed from storage device 32 by input interface. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure to use an adaptive rate model are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. In another example, video source 18 may include an IP camera. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback.

Destination device 14 includes an input interface 28, a video decoder 30, and a display device 31. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 31 may be integrated with, or external to, destination device 14. In some examples, destination device 14 may include an integrated display device and be configured to interface with an external display device. In other examples, destination device 14 may be a display device. In general, display device 31 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC developed the HEVC standard based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes. One draft of the HEVC standard, referred to as "HEVC Working Draft 10" or "WD10," is described in document JCTVC-L1003v34, Bross et al., "High efficiency video coding (HEVC) text specification draft 10," Joint Collaborative Team on Video Coding (JCT-VC) of ITU-T SG16 WP3 and ISO/IEC JTC1/SC29/WG11, 12th Meeting: Geneva, CH, 14-23 Jan. 2013, which, as of Apr. 8, 2013, is downloadable from http://phenix.int-evry.fr/jct/doc_end_user/documents/12_Geneva/wg11/JCTVC-L1003-v34.zip.

In general, the HM describes that a video frame or picture may be divided into a sequence of coding tree units (CTUs) or largest coding units (LCU) that include both luma and chroma samples. A CTU has a similar purpose as a macroblock of the H.264 standard. A slice includes a number of consecutive CTUs in coding order. A video frame or picture may be partitioned into one or more slices. Each CTU may be split into coding units (CUs) according to a quadtree. For example, a CTU, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a CTU may be split, and may also define a minimum size of the coding nodes.

A CU includes a coding node, as well as prediction units (PUs) and transform units (TUs) associated with the coding node. A size of the CU corresponds to a size of the coding node and may be square in shape. The size of the CU may range from 8×8 pixels up to the size of the CTU with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as TUs. Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more TUs. Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a CTU, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m. In some examples, video encoder 20 uses a quantization parameter to determine a rate model parameter.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not.

Video encoder 20 of FIG. 1 may be configured to decide whether to zero out a TU based on a rate distortion (RD) cost (compared to an RD cost of not zeroing out the TU). When video encoder 20 zeroes out a TU, video encoder 20 may set the values of all transform coefficients of the TU to zero. The RD cost to zero out the TU ($C_{zbd}$) may be set equal to the distortion incurred when the TU is zeroed out ($D_{zbd}$). The cost of not zeroing out the TU ($C_{inter}$) may be set equal to the distortion when transform coefficients inter, are encoded ($D_{inter}$) and the number of bits for the transform coefficients ($R_{coef}$) multiplied by a Lagrangian multiplier ($\lambda$). $R_{coef}$ may be modeled as a parameter multiplied by the number of non-zero coefficients (nnz) in the TU added to a parameter b. In one example, solutions use a fixed linear model of $R_{coef}$ where parameters a and b are set through a configuration file.

These solutions, however, may produce inefficient results when encoding certain video data such as video with a high noise level (from e.g., an IP camera). For example, noise is typically at a high frequency part of the transform coefficients in the block. The non-zero transform coefficients at high frequency results in more bits that the video encoder is required to encode. For instance, if parameters a and b are selected based on training sequences without noise, the resulting $R_{coef}$ may fail to correctly reflect the actual number of bits used and the cost of not zeroing out the block, $C_{inter}$, may be underestimated. This may result in not zeroing out the block resulting in a higher bit-rate and a lower peak signal-to-noise ratio (PSNR) which may hurt overall rate-distortion performance. In some examples, video encoder 20 may be configured to use values for parameters a and b based on training data from noisy static sequences. In some examples, parameter a may be quantization parameter (QP) dependent and b is not QP dependent. In such examples, b is not QP dependent because b is the number of bits when the number of non-zero coefficients is 0. Thus, in the foregoing examples, parameter a may take on a number of values depending on the selected QP value, whereas parameter b would have a static value. In other examples, both parameters are QP independent values or both are QP dependent values.

Video encoder 20 may also select parameters a and b adaptively. For example, parameters a and b may be initialized by video encoder 20. Parameters a and b may be initialized from any set of values whether it is the values for non-static sequences, or values based on static noisy sequences. The current frame may be encoded by video encoder 20 with initial values of parameters a and b as well as the quantization parameter. Video encoder 20 may collect the number of bits actually generated for frame i ($R_{coef,i}$) and the number of non-zero coefficients ($nnz_i$) for frame i. In an example, video encoder 20 may perform a linear regression to minimize the error to determine new values for parameters a and b. Alternatively, video encoder 20 may calculate updated values for new parameters a and/or b. In some examples, new parameter b may be a fixed value and new parameter a is adaptively changed. In some examples, parameter a (and/or b) is then updated using a weighted average of the new parameter a and the previously used parameter a. In other examples, video encoder 20 may update parameter a and/or parameter b to use new parameter a and/or parameter b.

As will be explained in more detail below, video encoder 20 of FIG. 1 may be configured to determine an amount of motion or movement in a frame of a sequence of frames. In some examples, video encoder 20 may collect the number of inter blocks (inter_cnt) and calculate the sum of amplitudes of motion vectors in the horizontal direction (mv_sum_hor) and in the vertical direction (mv_sum_ver) of a frame after encoding the frame. If video encoder 20 determines that the number of inter blocks is greater than a threshold T (i.e., there are enough inter blocks) and the average amplitude of motion vectors horizontally and vertically are less than a threshold t, then video encoder 20 may determine that the frame is static. Video encoder 20 may then estimate the next frame to be static or non-static, based on the determination of the previous frame.

Video encoder 20 may select a parameter set for a rate estimation model (e.g., a linear rate model) for a current frame, based on an amount of movement between frames. For instance, video encoder 20 may select the parameters a and b based on whether the frame is estimated to be static or non-static. In an alternative example, video encoder 20 may select the parameter set for the rate estimation model (e.g., linear rate model) based on an amount of movement in the present (current) frame. For example, video encoder 20 may estimate motion vectors (mv_hor and mv_ver) between the current frame and the previous frame and use the motion vectors as a metric to determine whether the frame is static or non-static. Video encoder 20 may also calculate a sum of absolute difference (SAD) between pixel values of the current frame and pixel value of the previous frame, based on the motion vectors. If the sum of horizontal motion vectors (mv_sum_hor) and the sum of vertical motion vectors (mv_sum_ver) are less than threshold t, and the SAD is less than threshold T, then the sequence may be determined to be static. It will be appreciated that SAD is just one example discussed herein. Other distortion metrics can also be used in accordance with this disclosure, e.g., sum of squared error (SSE), etc. Video encoder 20 may also calculate SAD or SSE values based on zero motion vectors, in determining whether a frame is static or non-static.

Based on the determination of static/non-static status, video encoder 20 may use a trained parameter set for a noisy and/or static sequence may be used, or otherwise, may use the trained parameter set for non-static and/or non-noisy sequences. Video encoder 20 may encode the frame based on the QP and the selected parameter set.

According to various examples of this disclosure, video encoder 20 (and/or various components thereof) may update one parameter (namely, parameter 'a') of a rate estimation model, based on: (1) an actual number of bits used to encode the non-zero coefficients of the frame, and (2) the actual number of non-zero coefficients in the frame. Video encoder 20 may also determine an amount of motion (or movement) in a frame, and may use the determined amount of motion/movement to update the parameter (namely, parameter 'a') of the rate estimation model.

By updating parameter 'a' of the rate estimation model before applying the rate estimation model to the blocks of the frame, video encoder 20 may implement model-updating techniques of this disclosure to zero out blocks of the frame in a more targeted fashion. In this way, video encoder 20 may implement the techniques of this disclosure to reduce bitrate and signaling overhead by zeroing out blocks, while maintaining or potentially improving coding precision by zeroing out blocks in a targeted fashion by updating the rate estimation model from frame to frame.

In certain use case scenarios, video frames are highly correlated temporally, especially in scenarios such as those of video telephony (VT) and video surveillance. In cases of video frames of a sequence being highly correlated temporally, the prediction error is usually very small. For example, it is observed that with certain VT-type frame sequences and under certain coding configurations, of all the 32×32 TU calculations, about 79% of those TUs are zero blocks. Existing encoding techniques may employ a model to decide whether or not to zero out a block (e.g., a TU), based on RD cost. That is, according to the existing encoding techniques, a video encoder may compare the RD cost ($C_{zbd}$) of zeroing out the block against the RD cost ($C_{inter}$) of not zeroing out the block. If the RD cost of zeroing out the block is the smaller than the RD cost of not zeroing out the block (i.e., $C_{zbd} < C_{inter}$), the video encoder zeroes out the block. Otherwise, a video encoder applies the inter mode to the block, and encodes and signals transform coefficients of the block. In this example, the video encoder may obtain $C_{zbd}$ and $C_{inter}$ as follows:

$$C_{zbd} = D_{zbd} \quad (1)$$

$$C_{inter} = D_{inter} + \lambda \cdot R_{coef} \quad (2)$$

where $D_{zbd}$ is the distortion incurred when the block is zeroed out, and $D_{inter}$ is the distortion when the transform coefficients of the block are encoded. $R_{coef}$ is the number of bits for the transform coefficients of the block, and $\lambda$ is a Lagrangian multiplier. The video encoder may estimate $R_{coef}$ based on the number of non-zero coefficients (nnz). In some exemplary encoders, the relationship of $R_{coef}$ and the number of non-zero coefficients nnz is modeled using the following linear model:

$$R_{coef} = a \cdot nnz + b \quad (3)$$

In the existing encoding techniques, parameters 'a' and 'b' of equation (3) are fixed values set through a configuration file.

However, the fixed linear rate model described above may not enable efficient encoding of some types of sequences, such as video sequences from an IP camera (as one use case example) with a high noise level. For such sequences, using the fixed linear rate model may have unexpected encoding results. For example, Table 1, below, compares two different LP (low delay P-prediction) configurations of IP camera sequence 720pBayBridge, which includes a relatively high level of noise. According to LP configuration, a first frame is encoded as an I-frame with a number of following frames encoded as P-frame.

TABLE 1

Comparison of Results of Two Encoding Configurations

| BayBridge720p | Bit-Rate(kb/s) | PSNR_Y(db) | PSNR_U(db) | PSNR_V(db) |
|---|---|---|---|---|
| QP_I = 20, QP_P = 21 | 1163.39 | 43.86 | 46.43 | 47.17 |
| QP_I = 20, QP_P = 22 | 1264.6 | 43.69 | 46.39 | 47.16 |

In one LP configuration, I frames are encoded with QP_I=20, and P frames are encoded with QP_P=21. In the other LP configuration, I frames are encoded with QP_I=20, and P frames are encoded with QP_P=22. Intuitively, it would be expected that the configuration where the video encoder uses QP_P=22 for P frames would result in a fewer number of bits than the configuration where the video encoder uses QP_P=21. However, to the contrary, the results in Table 1 above show that the configuration with QP_P=22 results in a higher bit rate than the configuration with QP_P=21 and a lower peak signal-to-noise ratio (PSNR), which indicates an inefficient result.

The higher bit rate may be attributed to the sequence having a lot of noise. In some examples of video sequences, such as IP camera sequences, the noise is at the high-frequency part of the transform coefficients in the block. The non-zero transform coefficients at the higher-frequency portion results in a greater number of bits required to be encoded. If parameters 'a' and 'b' of the linear fixed rate model are trained for sequences without noise, then the resulting $R_{coef}$ value may not correctly reflect the real number of bits to be used in noisy sequences. In these scenarios, the cost of not zeroing out the block ($C_{inter}$) may be underestimated. Nevertheless, in this example, the video encoder chooses the option of not zeroing out the block more frequently according to existing encoding techniques, and the result is a higher bitrate and lower PSNR encoding. Coding noise typically does not help temporal prediction, and thus may hurt overall rate-distortion performance.

Video encoder 20 may implement various techniques of this disclosure to train the linear rate model to identify blocks to be zeroed out in a more targeted fashion than in existing encoding techniques. In some examples, video encoder 20 may use an amount of motion/movement in a current frame or a previously-encoded frame to update parameter 'a' of the linear fixed model. In these and other examples, video encoder 20 may update parameter 'a' of the linear fixed model based on an actual number of bits used to encode the non-zero coefficients of the frame, and the actual number of non-zero coefficients in the frame. In this way, video encoder 20 may implement the techniques of this disclosure to reduce bitrate and signaling overhead by zeroing out blocks, while maintaining or potentially improving coding precision by zeroing out blocks in a targeted fashion by updating the rate estimation model from frame to frame.

Figure 2:
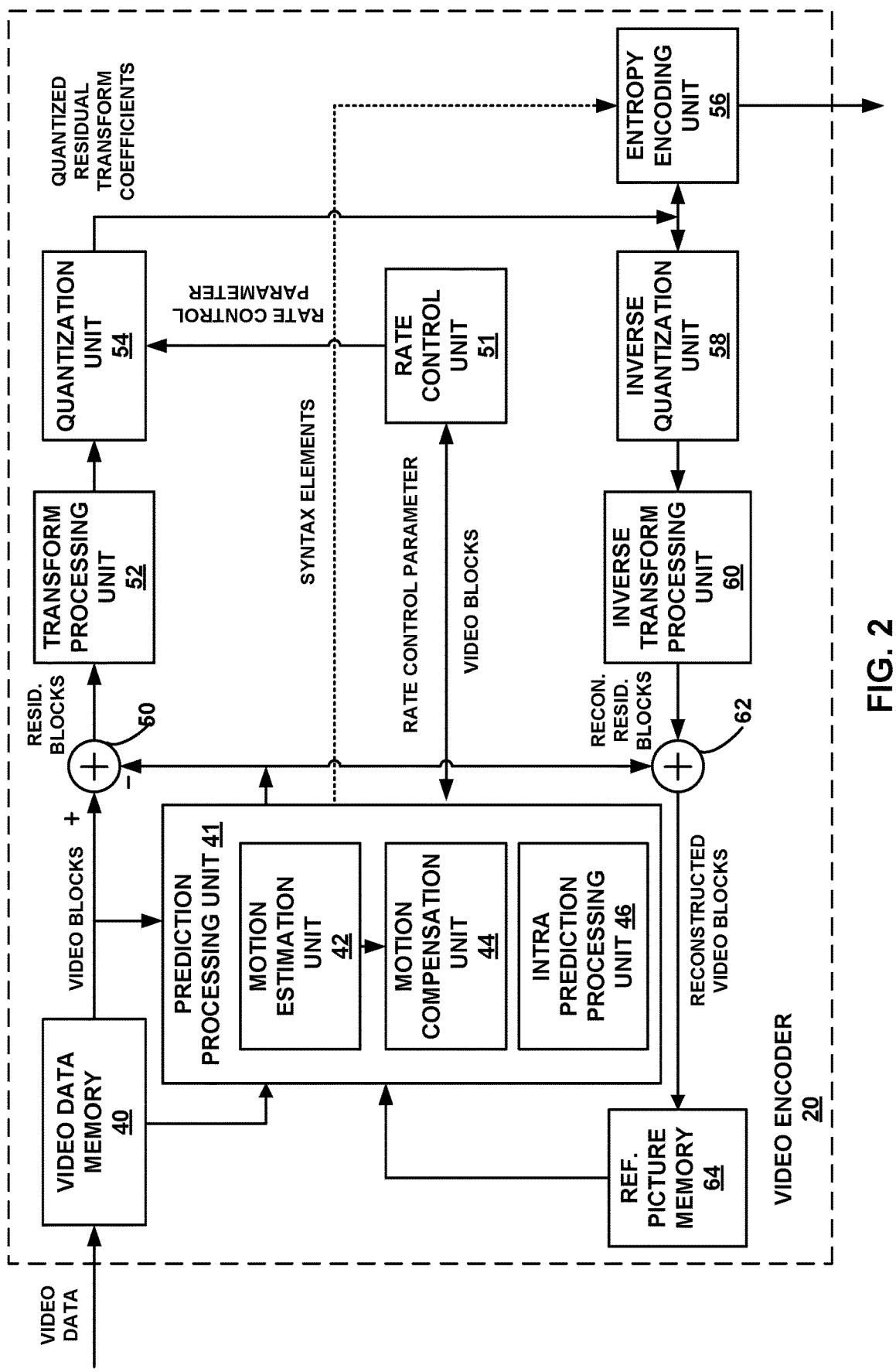
FIG. 2 is a block diagram illustrating an example video encoder that may implement the techniques described in this disclosure.

FIG. 2 is a block diagram illustrating an example video encoder 20 that may implement the adaptive rate model for zero block detection techniques described in this disclosure. Video encoder 20 may be configured to perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes video data memory 40, prediction processing unit 41, reference picture memory 64, summer 50, transform processing unit 52, quantization unit 54, rate control unit 51, and entropy encoding unit 56. Prediction processing unit 41 includes motion estimation unit 42, motion compensation unit 44, and intra prediction processing unit 46. For video block reconstruction, video encoder 20 also includes inverse quantization unit 58, inverse transform processing unit 60, and summer 62. A deblocking filter (not shown in FIG. 2) may also be included to filter block boundaries to remove blockiness artifacts from reconstructed video. If desired, the deblocking filter may filter the output of summer 62. Additional loop filters (in loop or post loop) may also be used in addition to the deblocking filter.

Video data memory 40 may store video data to be encoded by the components of video encoder 20. The video data stored in video data memory 40 may be obtained, for example, from video source 18. Reference picture memory 64 is one example of a decoded picture buffer (DPB) that stores reference video data for use in encoding video data by video encoder 20 (e.g., in intra- or inter-coding modes, also referred to as intra- or inter-prediction coding modes). Video data memory 40 and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 40 and reference picture memory 64 may be provided by the same memory device or separate memory devices. In various examples, video data memory 40 may be on-chip with other components of video encoder 20, or off-chip relative to those components.

Video encoder 20 receives video data, and a partitioning unit (not shown) partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block may be a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra prediction processing unit 46 may perform intra-prediction on a current block, as an alternative to the inter-prediction performed by motion estimation unit 42 and motion compensation unit 44, as described above. In particular, intra prediction processing unit 46 may determine an intra-prediction mode to use to encode a current block. In some examples, intra prediction processing unit 46 may encode a current block using various intra-prediction modes, e.g., during separate encoding passes, and intra prediction processing unit 46 may select an appropriate intra-prediction mode to use from the tested modes. For example, intra prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 46 may calculate ratios from the distortions and rates for the various encoded blocks to determine which intra-prediction mode exhibits the best rate-distortion value for the block.

In any case, after selecting an intra-prediction mode for a block, intra prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to a reference frame to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

Video encoder 20 may further include a rate control unit 51 which is configured to control the rate of video encoding (i.e., the number of bits that are used to represent the encoded video). Rate control unit 51 may control the rate of video encoding by determining a rate control parameter. The rate control parameter generated by rate control unit 51 may be used by both prediction processing unit 41 and quantization unit 54 to control the rate of video encoding. As will be explained in detail elsewhere in this disclosure, prediction processing unit 41 may use the rate control parameter in a rate-distortion analysis used to select a prediction mode (e.g., the best inter or intra prediction mode). In addition, quantization unit 54 may use the rate control parameter to determine a quantization parameter. Both the determined prediction mode and the quantization parameter affect the encoding rate of video encoder 20.

In accordance with the techniques of this disclosure, and as described elsewhere in this disclosure, video encoder 20 may be configured to estimate the number of bits for the transform coefficients of a block, $R_{coef}$. In one example, video encoder 20 may estimate $R_{coef}$ using the linear model $R_{coef}=a \cdot nnz+b$, of equation (3) above. In another example, video encoder 20 may improve the $R_{coef}$ determination by including, for consideration, coefficient position information. Coefficient position information refers to data indicating the position of one or more coefficients in a block. By considering coefficient position information in the determination of $R_{coef}$, video encoder 20 may determine $R_{coef}$ such that the estimated number of bits is a function of parameters 'a' and 'b' and of nnz and coefficient position information (pos). Equation (4) below describes the $R_{coef}$ determination techniques that include pos in the $R_{coef}$ determination:

$$R_{coef}=f(a, b, nnz, pos) \qquad (4)$$

When using the model for $R_{coef}$ of equation 4, video encoder 20 may use the adaptively-chosen model parameter 'a' and an unchanged value for parameter 'b' to compensate for deficiencies of this model.

After each frame is encoded, video encoder 20 may collect the number of bits actually generated and the number of non-zero coefficients. According to a linear regression, video encoder 20 may estimate parameters 'a' and 'b' by minimizing the following function:

$$F(a, b) = \min_{(a,b)} \sum (R_{coef,i} - a \cdot nnz_i - b)^2 \qquad (5)$$

$R_{coef,i}$ and $nnz_i$ are the collected number of bits for the block i and number of the non-zero coefficients in the block i in equation (5) above. It can be shown that the values of a and b that minimize the function F (equation 5) are:

$$a = \frac{\frac{1}{N}\sum R_{coef,i} \cdot nnz_i - \frac{1}{N}\sum R_{coef,i} \frac{1}{N}\sum nnz_i}{\frac{1}{N}\sum nnz_i^2 - \left(\frac{1}{N}\sum nnz_i\right)^2} = \frac{cov(R_{coef}, nnz)}{var(nnz)} \qquad (6)$$

$$b = \frac{1}{N}\sum R_{coef,i} - a \cdot \frac{1}{N}\sum nnz_i \qquad (7)$$

In equations (6) and (7), cov(·) is the covariance function, and var(·) is the variance function.

In cases where the number of non-zero coefficients is zero, video encoder 20 may be configured to signal header bits (e.g. header data such as PPS, slice header, etc. as well as motion vector bits and block prediction mode bits), the number of which is usually a constant. In an example, parameter 'b' may be set to a constant number (to indicate the number of header bits, directly or indirectly), and video encoder 20 may adaptively change parameter 'a' according to collected nnz and $R_{coef}$ values. In this case, the calculation of parameter 'a' is represented by equation (8) below:

$$a = \frac{\sum (nnz_i \cdot R_{coef,i} - b \cdot nnz_i)}{\sum nnz_i^2} = \frac{S\_xy_i - b \cdot S\_x_i}{S\_x2_i} \qquad (8)$$

$$S\_xy = \sum nnz_i \cdot R_{coef,i} \qquad (9)$$

$$S\_x = \sum nnz_i \qquad (10)$$

$$S\_x2 = \sum nnz_i^2 \qquad (11)$$

Video encoder 20 may designate initial values to parameters a and b. In turn, after encoding each frame, video encoder 20 may collect sum values of the number of non-zero coefficients $nnz_i$ and the number of bits of the coefficients $R_{coef,i}$ from every block i. Video encoder 20 may compute values for S_xy using equation (9), S_x using equation (10), and S_x2 using equation (11). After calculating the values of S_xy, S_x, and S_x2, video encoder 20 may obtain a new value of parameter 'a' (new_a) using equation (8). For each of variables S_xy, S_x, and S_x2, x represents nnz and y represents $R_{coef}$. Again, each of variables S_xy, S_x, and S_x2, is referred to herein as a "sum value" and as such, video encoder 20 may determine sum values variables S_xy, S_x, and S_x2 as part of updating parameter 'a' according to the techniques of this disclosure.

In some examples, video encoder 20 may update the parameter 'a' using weighted averaging of the new value of parameter 'a' (new_a) and a previous value of parameter 'a' (prev_a), as shown in equation (12) below:

$$a=w*new\_a+(1-w)*prev\_a \qquad (12)$$

In further examples, video encoder 20 may use a group of pictures (GOP) structure with multiple temporal layers, each temporal layer may have its own rate estimation model and the current frame may refer to the rate estimation model of the previous frame in the same temporal layer instead of its immediate previous frame. In further examples, video encoder 20 may improve the accuracy of estimation by using more complex models than a linear model, because rate estimation may not follow linear models for some types of content. For example, video encoder 20 may use Nth-order models or a neural network-based model.

Video encoder 20 may use different sets of parameters 'a' and 'b' for different types of content. For example, video encoder 20 may use separate rate estimation model for static (e.g., IP camera sequences for video surveillance) sequences and non-static (e.g. higg-motion) sequences respectively, because the percentage of bits consumed by noise relative to total bits used may be different between static and non-static sequences. As a result, the rate estimation models may indicate preferences to different parameters. In an example technique of this disclosure, video encoder 20 may use a different set of parameters 'a' and 'b' for static sequences than for non-static sequences.

In some examples, the values of parameters 'a' and 'b' are dependent upon the QP used by video encoder 20. In some examples, parameter a may be found to be QP dependent and parameter b may be found to not be QP dependent. Parameter b may not be QP dependent because the value of parameter 'b' is based on the number of bits when the number of non-zero coefficients is zero (0). For different QP values, video encoder 20 may train the parameters 'a' and 'b' that provide the best coding efficiency. In one implementation, parameters 'a' and 'b' are 16-bit unsigned integers for noisy sequences, and parameters a and b are set as follows:

```
UInt16 param_a[52] = {
//0,    1,     2,     3,     4,     5,     6,     7
41862, 41862, 41862, 41862, 41862, 41862, 41862, 41862,
// 8,   9,    10,    11,    12,    13,    14,    15
41862, 41862, 41862, 41862, 41862, 41862, 41862, 41862,
//16,  17,    18,    19,    20,    21,    22,    23
41862, 41862, 51862, 61862, 36862, 46862, 56862, 36862,
//24,  25,    26,    27,    28,    29,    30,    31
46862, 41862, 51862, 56862, 51862, 61862, 61862, 61862,
//32,  33,    34,    35,    36,    37,    38,    39,
61862, 51862, 56862, 56862, 56862, 56862, 56862, 56862,
//40,  41,    42,    43,    44,    45,    46,    47
56862, 56862, 56862, 56862, 56862, 56862, 56862, 56862,
//48,  49,    50,    51
56862, 56862, 56862, 56862};
UInt16 param_b = 28405;
```

In this example, the value of parameter 'a', shown above, is indexed by QP values. For example, when QP=22, parameter 'a' may be determined as follows: a=param_a[QP]=param_a[22]=56862. Parameter b is independent of QP and may be a predetermined value, such as 28405.

Video encoder 20 may determine whether the current frame is static or non-static. For instance, video encoder 20 may collect encoding statistics such as the absolute sum of amplitudes of motion vectors and the number of inter blocks of the previous frame. In an example, when the average amplitude of motion vectors in the frame is less than a threshold, video encoder 20 may determine that the current frame is static, and may use the parameter set $(a_1,b_1)$ for noisy and/or static sequences. Otherwise, video encoder 20 may use another parameter set $(a_2,b_2)$ for non-noisy and/or non-static sequences. In another example with increased preprocessing, video encoder 20 may detect static sequences based on an estimate of the motion of the current frame and a sum of absolute differences (SAD) between the current frame pixel values and a previous frame pixel values. For examples, if a sum of motion vectors of the current frame is less than a threshold (e.g., a predetermined threshold specified by video encoder 20) and the SAD is less than a threshold (e.g., a predetermined threshold specified by video encoder 20), video encoder 20 may determine that the current frame is static, and may therefore select the parameter set $(a_1,b_1)$ for noisy sequences. Otherwise, video encoder 20 may select the parameter set $(a_2,b_2)$ for non-noisy and/or non-static sequences.

Video encoder 20 may adaptively select parameter set (a,b) based on detecting whether a sequence is static or not using collected encoding statistics regarding the number of inter blocks in frames of the sequence and amplitudes of motion vectors of frames in the sequence. After encoding one frame of the sequence, video encoder 20 may collect the number of inter blocks of the frame (inter_cnt) and the sum of amplitudes of motion vectors of the inter blocks of the frame in the horizontal direction (mv_sum_hor) and the sum of amplitudes of motion vectors of the inter blocks of the frame in the vertical direction (mv_sum_ver). If the number of inter blocks of the frame is bigger (greater) than a threshold T and the average amplitude of motion vectors of the frame horizontally and vertically are less than a threshold t, video encoder 20 may determine that the frame is static. In this scenario, video encoder 20 may estimate that the next frame will be static, and video encoder 20 may therefore use the parameter set $(a_1,b_1)$ for a static sequence. Otherwise, video encoder 20 may use the parameter set $(a_2,b_2)$ for a non-static sequence. In some examples, video encoder 20 selects threshold T to ensure that there are enough inter blocks. For instance, video encoder 20 may calculate T as 0.95*total_8×8_blocks. In other examples, threshold T is predefined in a video coding standard. In some examples, video encoder 20 may select threshold t to ensure that motion in the frame is limited. In one implementation, the value oft may be 1.5. In other examples, threshold t is predefined in a video coding standard.

Figure 3:
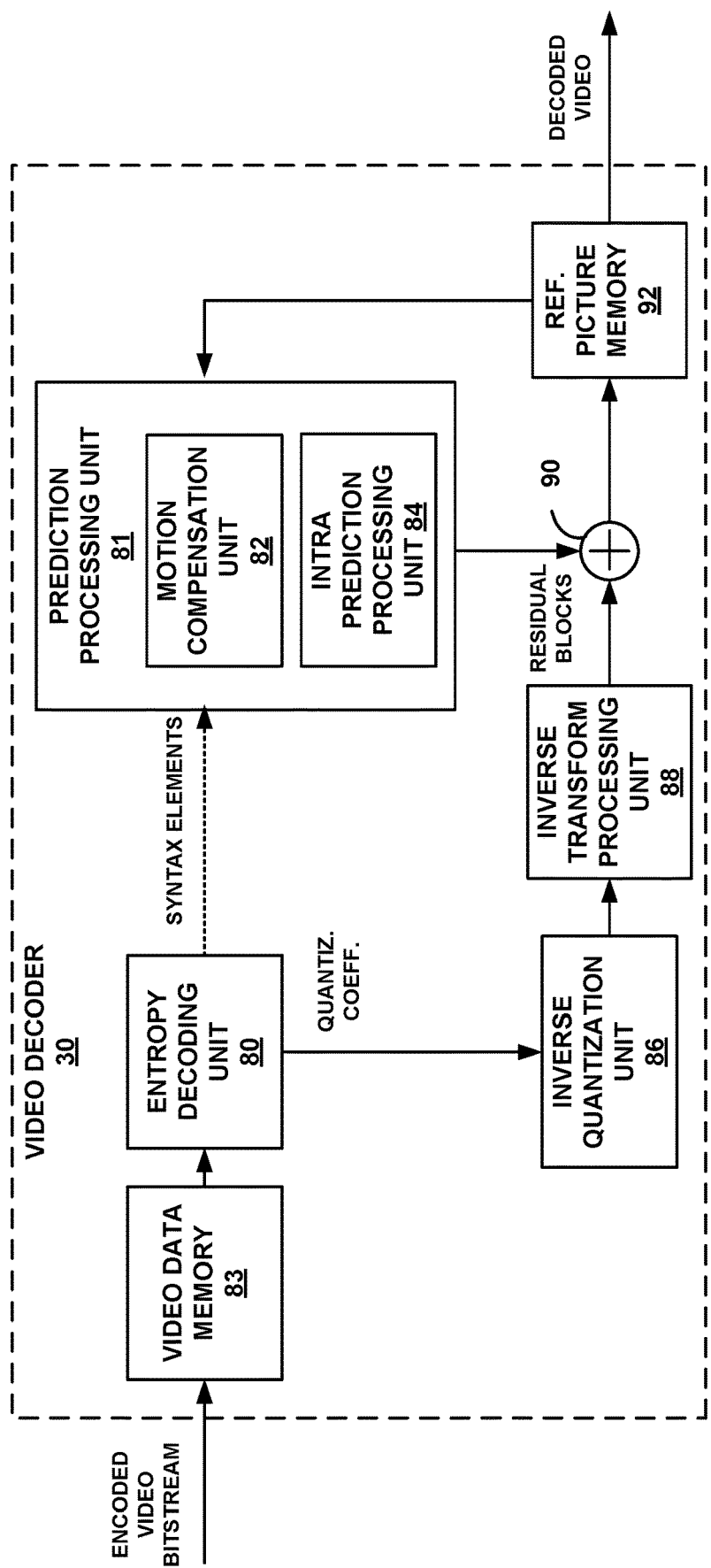
FIG. 3 is a block diagram illustrating an example video decoder.

FIG. 3 is a block diagram illustrating an example video decoder 30. In the example of FIG. 3, video decoder 30 includes video data memory 83, entropy decoding unit 80, prediction processing unit 81, inverse quantization unit 86, inverse transformation processing unit 88, summer 90, and reference picture memory 92. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 2.

Video data memory 83 may store video data to be decoded by the components of video decoder 30. The video data stored in video data memory 83 may be obtained, for example, from video encoder 20. Reference picture memory 92 is one example of a decoded picture buffer (DPB) that stores reference video data for use in decoding video data by video decoder 30 (e.g., in intra- or inter-coding modes, also referred to as intra- or inter-prediction coding modes). Video data memory 83 and reference picture memory 92 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 83 and reference picture memory 92 may be provided by the same memory device or separate memory devices. In various examples, video data memory 83 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B or P) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference picture memory 92 also stores decoded video for later presentation on a display device, such as display device 31 of FIG. 1.

Figure 4:
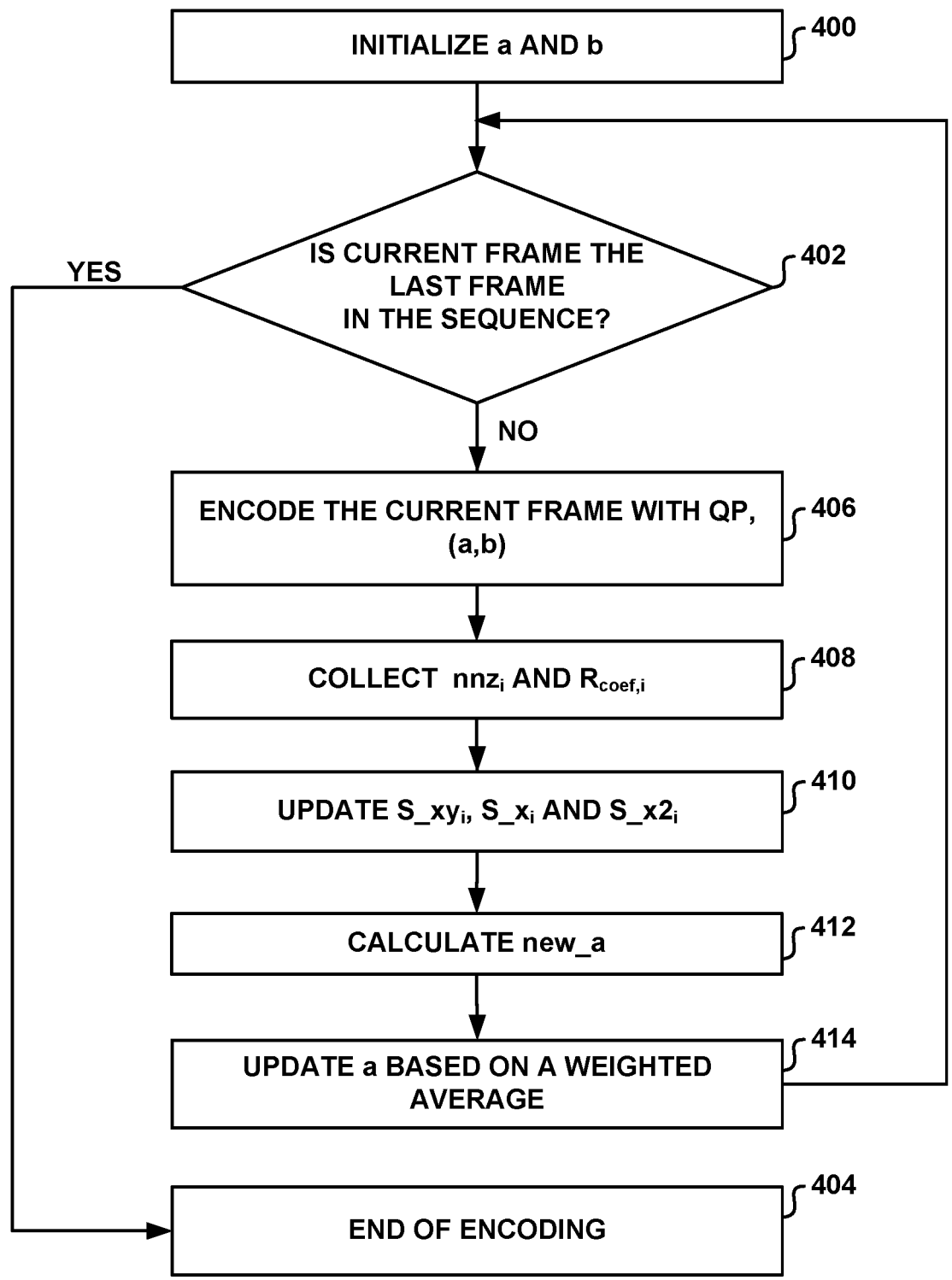
FIG. 4 is a flowchart illustrating an example method of adaptively selecting parameter set (a, b) according to the techniques described in this disclosure.

FIG. 4 is a flowchart illustrating an example method of adaptively selecting parameter set (a,b). The techniques of FIG. 4 may be implemented by one or more components of video encoder 20.

In one example of the disclosure, video encoder 20 is configured to initialize parameters a and b with some predefined values (400). The initialized parameters a and b may be based on data in a configuration file for non-static sequences for parameters a and b or may be derived based on a set of training data. For example, parameters a and b may be set based on values of parameters a and b in param_a and param_b as discussed above. In such an example, video encoder 20 may use the QP value to select an initial value for parameter a.

Video encoder 20 may determine whether the current frame is the last frame in the sequence (402). If the current frame is the last frame ("YES" branch of 402), video encoder 20 may end encoding (404). If the current frame is not the last frame ("NO" branch of 402), video encoder 20 may encode the current frame with the QP and parameter set (a,b) (406). Video encoder 20 may collect the number of non-zero coefficients ($nnz_i$) and the number of bits on the coefficient $R_{coef,i}$ used in the encoding in step 406 (408). Video encoder 20 may calculate values for $S\_xy_i$, $S\_x_i$ and $S\_x2_i$ (410). $S\_xy_i$ may be calculated from equation 9. $S\_x_i$ may be calculated from equation 10. $S\_x2_i$ may be calculated from equation 11. Video encoder 20 may calculate a new value of parameter a (new_a) (412). Video encoder 20 may calculate the new value of parameter a (new_a) from equation 8. Furthermore, in the example of FIG. 4, video encoder 20 determine an updated value of parameter a based on the weighted average of the previously used value of parameter a and new_a (414). Video encoder 20 may calculate the updated value of parameter a using equation 12. Video encoder 20 may then continue with the next frame and step 402 of the method.

Figure 5:
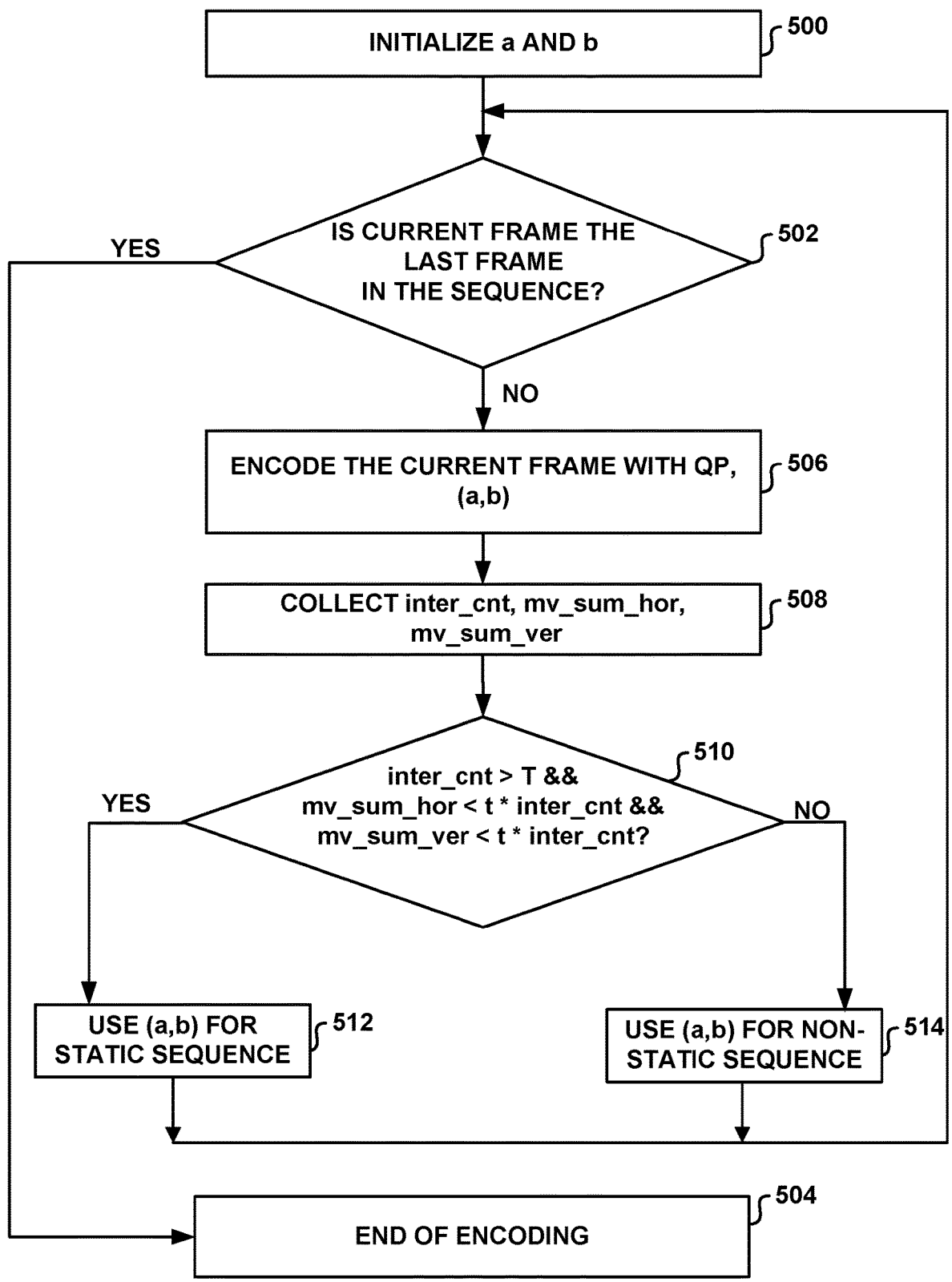
FIG. 5 is a flowchart illustrating an example method of selection of different parameter sets for static and non-static sequences based on the previous frame's coding statistics.

FIG. 5 is a flowchart illustrating an example method of selection of parameter set ($a_1,b_1$) for static and parameter set ($a_2,b_2$) for non-static sequences based on the previous frame's coding statistics. The techniques of FIG. 5 may be implemented by one or more components of video encoder 20.

In one example of the disclosure, video encoder 20 is configured to initialize parameters a and b with predefined values (500). The initialized parameters a and b may be based on data in a configuration file for non-static sequences for parameters a and b or may be derived based on a set of training data. For example, parameters a and b may be set based on values of parameters a and b in param_a and param_b as discussed above. In such an example, the QP value may be used to select an initial value for parameter a. Video encoder 20 may determine whether the current frame is the last frame in the sequence (502). If the current frame is the last frame ("YES" branch of 502), video encoder 20 may end encoding (504). If the current frame is not the last frame ("NO" branch of 502), video encoder 20 may encode the current frame with the QP and parameter set (a,b) (506). Video encoder 20 may collect the number of inter blocks of the current frame (inter_cnt) and the sum of amplitude of motion vector of the current frame in the horizontal direction (mv_sum_hor) and in the vertical direction of the current frame (mv_sum_ver) (508).

Video encoder 20 may be configured to determine if the number of inter blocks (inter_cnt) is greater than a first threshold (T) and average amplitude of motion vector horizontally (e.g., mv_sum_hor divided by inter_cnt) and vertically (e.g., mv_sum_ver divided by inter_cnt) are less than a second threshold (t), video encoder 20 may determine the frame is static ("YES" branch of 510). Video encoder 20 may estimate that the next frame will be static and video encoder 20 may use the parameter set (a,b) for the static sequence (512). Otherwise video encoder 20 may determine the frame is non-static ("NO" branch of 510). Video encoder 20 may estimate that the next frame will be non-static and video encoder 20 may use the parameter set (a,b) for the non-static sequence (514). Video encoder 20 may then continue with the next frame and step 502 of the method. The first threshold (T) may be calculated using the formula k*total_8×8_blocks, where k is a constant, e.g. 0.9, 0.95, or others. The value for first threshold T may be based on there being a great enough number of inter encoded blocks. In some examples, the second threshold (t) may be a constant e.g. 1.5. In other examples, the value of T and t may be made adaptive based on other factors such as video frame spatial resolution, video frame temporal resolution (i.e. frames per second), etc. The second threshold 't' is set to ensure there is limited motion in a frame using the parameter set (a,b) for the static sequence. Both thresholds (T and t) are empirical values and together they make sure the motion in the frame is small and there are enough inter-encoded blocks.

The process illustrated in FIG. 5 has a one frame delay and relies on the assumption that if the previous frame is static, quite likely the current frame is static. This assumption holds most of the time and may save time for preprocessing, but there are times it may fail. When the assumption fails, the selection of (a,b) will be improper for the frame and coding efficiency may be penalized. When intensive preprocessing is allowed by video encoder 20, motion may be estimated before encoding, which involves some delay and coding efficiency may not be penalized, as shown in FIG. 6.

Figure 6:
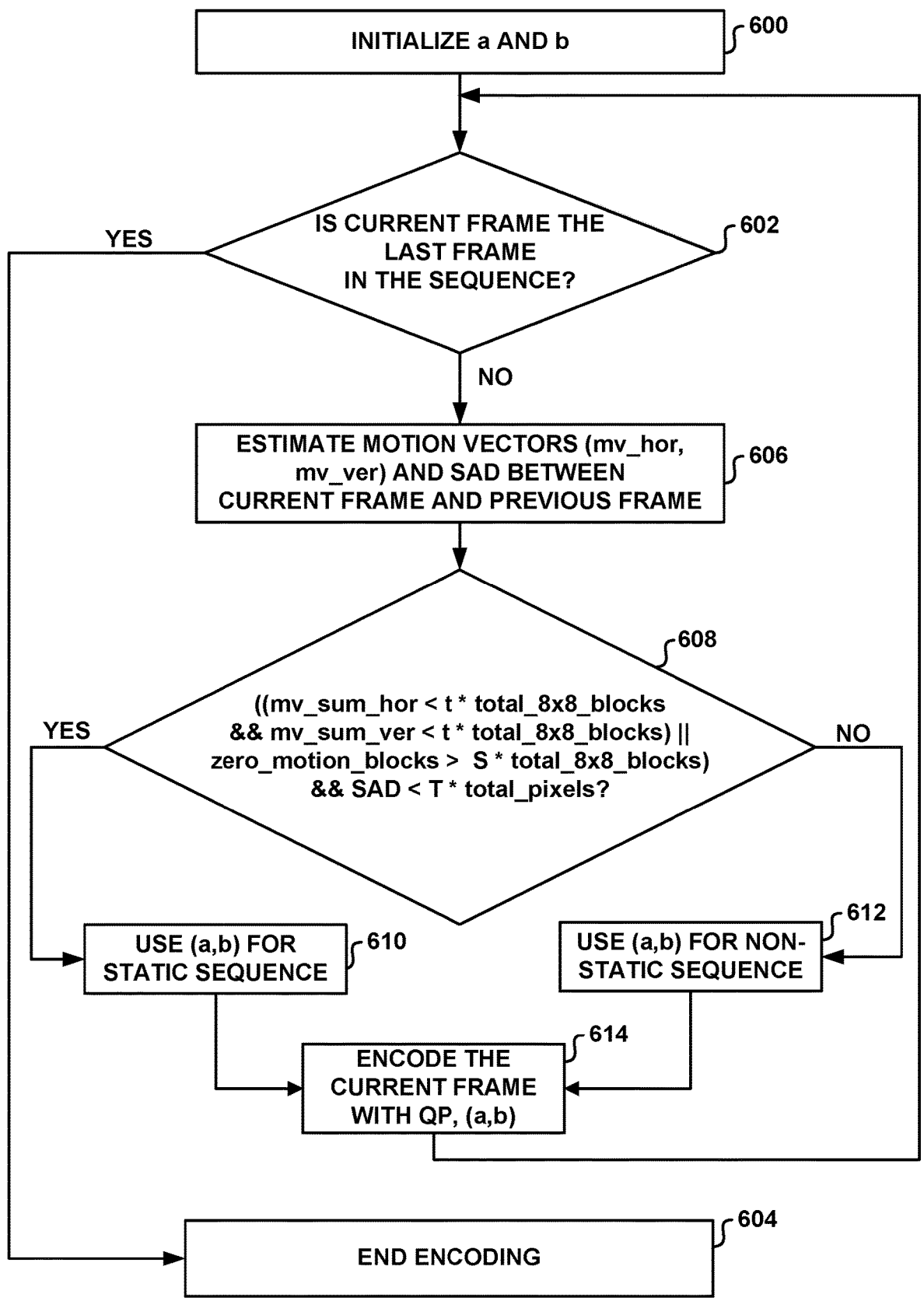
FIG. 6 is a flowchart illustrating an example method of selection of different parameter sets for static and non-static sequences based on preprocessing of the current frame.

FIG. 6 is a flowchart illustrating an example method of selection of parameter set ($a_1,b_1$) for static and parameter set ($a_2,b_2$) for non-static sequences based on preprocessing of the current frame. The techniques of FIG. 6 may be implemented by one or more components of video encoder 20.

In one example of the disclosure, video encoder 20 may be configured to initialize parameters a and b with some predefined values (600). The initialized parameters a and b may be based on data in a configuration file for non-static sequences for parameters a and b or may be derived based on a set of training data. For example, parameters a and b may be set based on values of parameters a and b in param_a and param_b as discussed above. In such an example, the QP value may be used to select an initial value for parameter a. Video encoder 20 may determine whether the current frame is the last frame in the sequence (602). If the current frame is the last frame ("YES" branch of 602), video encoder 20 may end encoding (604). If the current frame is not the last frame ("NO" branch of 602), before encoding the current frame, video encoder 20 may estimate the motion vectors between the current frame and the previous frame and obtain a sum of absolute difference (SAD) between the current frame and the previous frame (606). Video encoder 20 may be configured to determine if the sum of horizontal motion vectors (mv_sum_hor) and the sum of vertical motion vectors (mv_sum_ver) are both less than a first threshold (t) multiplied by the total number of 8×8 blocks (total_8×8_blocks), or the number of blocks with zero motion (zero_motion_blocks) is greater than a second threshold (s) multiplied by the total number of 8×8 blocks (total_8×8_blocks), and the SAD is less than a third threshold (T) multiplied by the total number of pixels (total_pixels), then video encoder 20 may determine that the current sequence is static ("YES" branch of 608) and use the trained parameter set (a,b) for the static (and/or noisy) sequence (610). Otherwise ("NO" branch of 608), video encoder 20 may use the trained parameter (a,b) for non-static (and/or non-noisy) sequence (612). Then based on the QP and selected parameter set (a,b), video encoder 20 encodes the frame (614). Video encoder 20 may then continue with the next frame and step 602 of the method. Threshold t in FIG. 6 may be the same as in FIG. 5 and may be set to ensure there is limited motion in a frame using the parameter set (a,b) for the static sequence. In an example, threshold t may be set to 1.5. Threshold T can be set as a small value such that the SAD between frames is small. In an example, threshold T may be set to 2.5. In an example, threshold S may be set to be 0.4. Thresholds S, T and t are empirical values, and thresholds S, T, and t together ensure the motion in the frame is small and the scene is relatively static.

Figure 7:
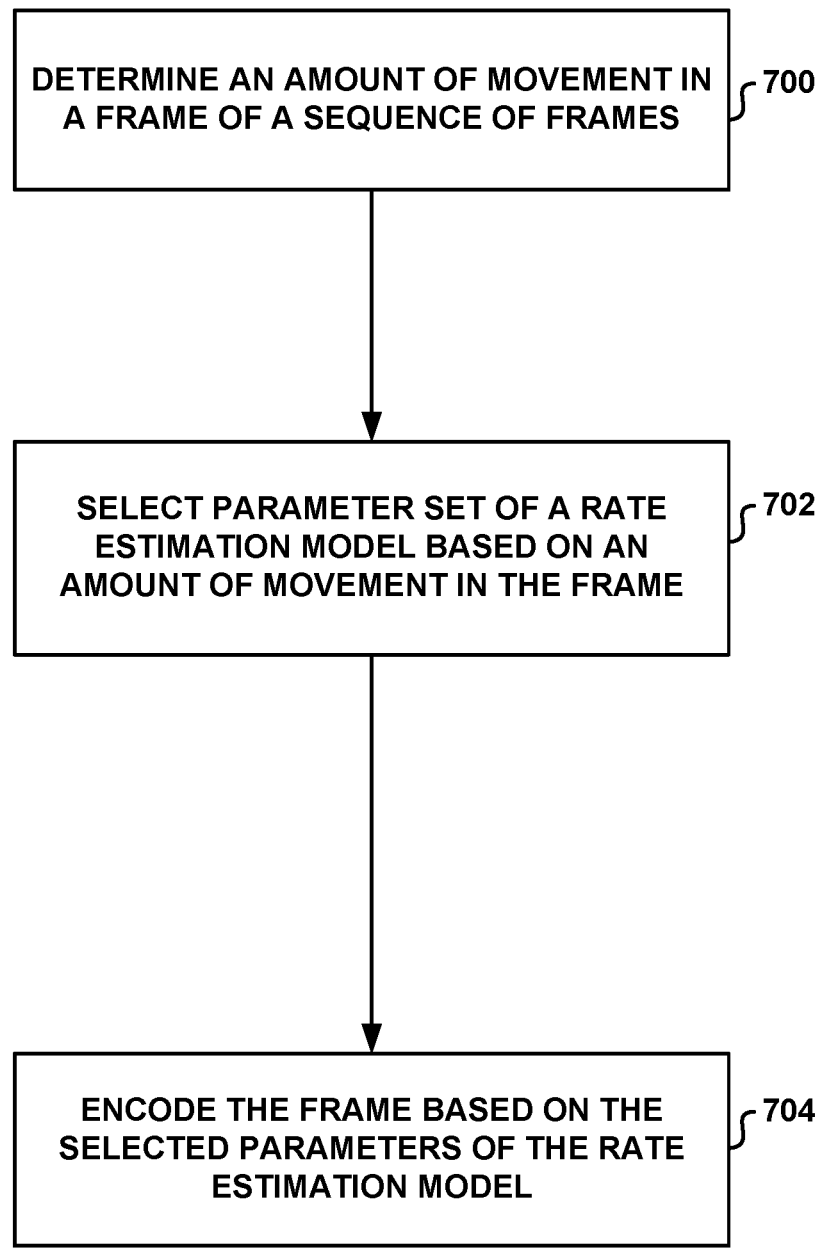
FIG. 7 is a flowchart illustrating an example method of the disclosure.

FIG. 7 is a flowchart illustrating an example process according to techniques of the present disclosure. The techniques of FIG. 7 may be implemented by video encoder 20, one or more components thereof, or a variety of other devices, in accordance with the aspects of this disclosure. For instance, processing circuitry of video encoder 20 (and/or processing circuitry of one or more components thereof) may perform aspects of the process illustrated in FIG. 7, as well as the other examples described below.

As shown in FIG. 7, video encoder 20 may determine an amount of movement in a frame of a sequence of frames (700). The frame may be a current frame (e.g., a frame currently being encoded) or a previously-encoded frame of the sequence. In one example, video encoder 20 may be configured to determine the movement in the frame if the number of inter blocks in the frame (inter_cnt) is greater than a first threshold (T) and average amplitudes of motion vector horizontally (mv_sum_hor divided by inter_cnt) and vertically (mv_sum_ver divided by inter_cnt) are less than a second threshold (t), video encoder 20 may determine the frame is static. Video encoder 20 may estimate that the next frame will be static and video encoder 20 may use the parameter set (a,b) for the static sequence. In another example, video encoder 20 may determine that if the sum of horizontal motion vectors of either the current frame or a previously-encoded frame of the sequence (mv_sum_hor) and the sum of vertical motion vectors of either the current frame or a previously-encoded frame of the sequence (mv_sum_ver) are both less than a first threshold (t) multiplied by the total number of 8×8 blocks (total_8×8_blocks), or the number of blocks with zero motion (zero_motion_blocks) is greater than a second threshold (s) multiplied by the total number of 8×8 blocks (total_8×8_blocks), and the SAD is less than a third threshold (T) multiplied by the total number of pixels (total_pixels), then video encoder 20 may determine that the current sequence is static and use the trained parameter set (a,b) for the static (and/or noisy) sequence. Otherwise, video encoder 20 may use the trained parameter (a,b) for non-static sequences.

Video encoder 20 may be configured to select a parameter set for a rate estimation model (e.g., a linear rate model) based on the determined amount of movement in the frame (702). The rate model may be a linear rate model to estimate a number of non-zero coefficients in a transform unit. The rate model may also be based on a position of non-zero coefficients in the frame. Selection of parameters of the rate model may follow the algorithms illustrated in FIGS. 5 and 6.

Video encoder 20 may be configured to encode the frame based on the rate estimation model (e.g., a linear rate model) (704). In various examples, video encoder 20 may identify, from a plurality of transform units of the frame, one or more transform units to be zeroed out. For instance, video encoder 20 may be configured to implement the rate estimation model (e.g., a linear rate model) to each block of the frame, to estimate rate distortion costs associated with decisions to either zero out each block, or to not zero out each block. Video encoder 20 may compare the first rate distortion cost of zeroing out a block of the transform unit against the second rate distortion cost of not zeroing out the block. The second rate distortion cost is estimated as being the sum of a distortion when the coefficients of the block are encoded and the Lagrangian multiplier multiplied by the number of bits required to encode coefficients of the block.

In some examples, video encoder 20 may apply the rate estimation model to estimate a number of bits to encode a number of non-zero coefficients in each respective transform unit of the plurality of transform units. In some examples, video encoder 20 may select the parameter set for the rate estimation model comprises selecting the parameter set further based on a quantization parameter (QP) value. In some examples, video encoder 20 may apply the rate estimation model to estimate a number of bits to encode a number of non-zero coefficients in a transform unit based on a product of a first parameter of the parameter set multiplied by a sum of a number of non-zero coefficients in the frame added to a second parameter of the parameter set. In some examples, video encoder 20 may select, based on the application of the rate estimation model, from a plurality of available coding modes, an optimal coding mode with respect each respective block of the frame.

In some examples, video encoder 20 may collect a number of non-zero coefficients of a previously-encoded frame of the sequence of frames, collect a number of bits used to encode the non-zero coefficients of the previously-encoded frame, and update only a first parameter of the parameter set based on the number of bits used to encode the non-zero coefficients of the previously-encoded frame and the number of non-zero coefficients of the previously-encoded frame to form the adaptively selected parameter set. In some examples, video encoder 20 may update only the first parameter of the parameter set comprises updating the first parameter based on a weighted average of a previous value of the first parameter and a newly determined value for the first parameter.

In some examples, video encoder 20 may determine the amount of movement in the frame by collecting: (i) a number of inter-encoded blocks used to encode a previously-encoded frame of the sequence, and (ii) a degree of motion of the frame of the sequence. In some examples, video encoder 20 may determine the amount of movement in the frame based on a determination that both of a first condition and a second condition are true, where the first condition comprises the number of inter-encoded blocks used to encode the previously-encoded frame being greater than a first threshold value, and the second condition comprises the degree of motion of the frame being less than a product of the number of inter-encoded blocks used to encode the frame multiplied by a second threshold value.

In some examples, video encoder 20 may select the parameter set for the rate model based on an amount of movement in the frame or the previous frame by either selecting a first parameter set associated with a static sequence based on both of the first condition and the second condition being true, or by selecting a second parameter set associated with a non-static sequence based on at least one of the first condition or the second condition being false. In some examples, the frame is a current frame, and video encoder 20 may determine the amount of movement in the current frame by estimating horizontal and vertical motion vectors and a distance metric determining the distance between the current frame and a previously-encoded frame.

In some examples, video encoder 20 may determine the amount of movement in the current frame by determining whether at least one of a first condition or a second condition is true, where the first condition comprises a sum of horizontal motion vectors and a sum of vertical motion vectors both being less than a first threshold value, and the second condition comprises the number of blocks with zero motion being greater than a second threshold value and the distance metric being less than a third threshold value. In some examples, video encoder 20 may select the parameter set by either selecting a first parameter set associated with a static sequence based on at least one of the first condition or the second condition being true, or by selecting a second parameter set associated with a non-static sequence based on neither the first condition nor the second condition being true.

Figure 8:
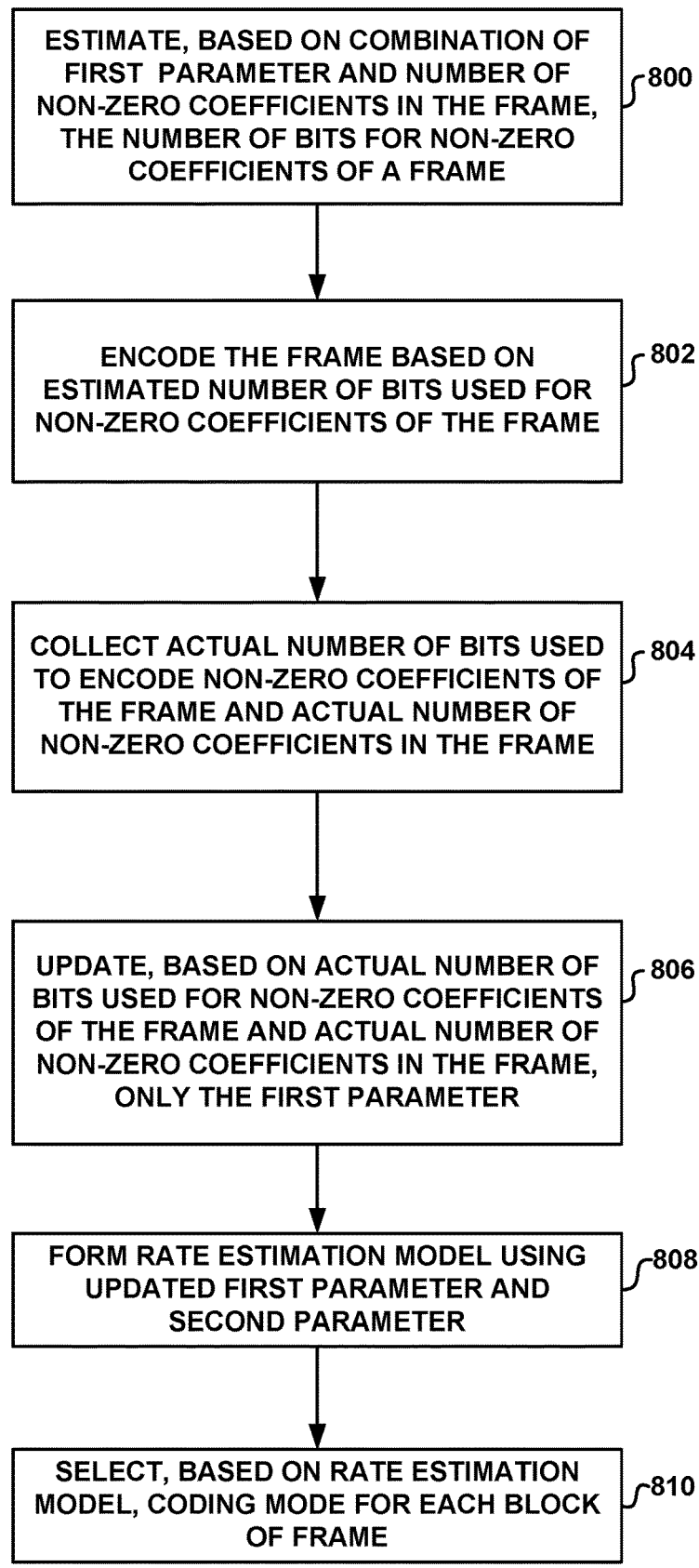
FIG. 8 is a flowchart illustrating an example method of the disclosure.

FIG. 8 is a flowchart illustrating an example process according to techniques of the present disclosure. The techniques of FIG. 8 may be implemented by video encoder 20, one or more components thereof, or a variety of other devices, in accordance with aspects of this disclosure. For instance, processing circuitry of video encoder 20 (and/or processing circuitry of one or more components thereof) may perform aspects of the process illustrated in FIG. 7, as well as the other examples described below.

Video encoder 20 may estimate, based on a combination of a first parameter and a number of non-zero coefficients (nnz) in the frame, a number of bits for non-zero coefficients of a frame ($R_{coef}$) (800). Video encoder 20 may be configured to encode the frame based on the estimated number of bits for the non-zero coefficients of the frame (802). Video encoder 20 may be configured to collect an actual number of bits used to encode the non-zero coefficients and an actual number of non-zero coefficients in the frame (804). Video encoder 20 may be configured to update, based on the actual number of bits used by non-zero coefficients used to encode the frame and the actual number of non-zero coefficients in the frame, only the first parameter (806). As used herein, "only the first parameter" refers to a selection of the first parameter from the pool of the first parameter and second parameter. As such, it will be appreciated that values outside of the first parameter and second parameter may also be updated based on the listed criteria, but that according to certain techniques of this disclosure, video encoder 20 may update the first parameter based on the listed criteria, while leaving the second parameter value unchanged.

Video encoder 20 may update the first parameter based on a weighted average of a previous value of the parameter and a newly determined value for the at least one parameter. Updating the at least one parameter may include determining values for $S\_xy_i$, $S\_x_i$, and $S\_x2_i$, as shown in equations 8-11, discussed above. The number of bits used by non-zero coefficients of the frame may be based on a linear rate modeled after the formula: parameter a multiplied by the number of non-zero coefficients in the frame added to parameter b. The number of bits used by non-zero coefficients of the frame may be further estimated based on a position of non-zero coefficients in the frame.

Video encoder 20 may form a rate estimation model using the updated first parameter (new_a) and a second parameter (b) (808). For instance, the value of the second parameter 'b' may be unchanged, while 'new_a' represents the updated value of the first parameter 'a'. In turn, video encoder 20 may select, based on the rate estimation model, a coding mode for each block in the frame (810). When the techniques in the present disclosure are tested, the results show that for IP camera sequences where there is a lot of noise, on average the method can improve the BD-rate by about 7% from 12.6% (where parameters a and b are fixed) to 20.1% (where parameter a is selected adaptively). When the technique of selection of ($a_1,b_1$) for static sequences and ($a_2,b_2$) for non-static sequences based on previous frame's coding statistics (illustrated in FIG. 5) is applied, the BD-rate can also improve by about or over 7%, e.g. from 12.6% to 21.1%. For JCTVC sequences where there is little camera noise, the BD-rate of the adaptive method is almost same as using the fixed parameters.

TABLE 2

Performance Gain of the Proposed Methods

| | ZBD on (Fixed a, b) | Adaptive ZBD |
|---|---|---|
| Nest sequence (VBR) | −12.6% | −20.1% |
| JCTVC sequence (VBR) | −4.0% | −5.3% |

Table 2 shows the performance gain compared with when zero block detection (ZBD) is off. When ZBD is on with fixed a, b parameters, the gain is 12.6% for NEST sequences (e.g., IP camera sequences with noise), and the gain is 4.0% for JCTVC sequences (e.g., clean sequences). When parameters a and b are adaptively selected (e.g., in the manner illustrated in FIG. 5), the gain is 20.1% for NEST sequences and 5.3% for JCTVC sequences.

In some examples, video encoder 20 may determine the actual number of bits used to encode the non-zero coefficients of the frame based on a multiplication product of the updated first parameter and the number of non-zero coefficients in the frame. In some examples, video encoder 20 may determine the actual number of bits used to encode the non-zero coefficients of the frame further comprises adding the second parameter to the multiplication product. In some examples, to estimate the number of bits used for the non-zero coefficients of the frame, video encoder 20 may estimate the number of bits used for the non-zero coefficients of the frame further based on respective positions of one or more of the non-zero coefficients in the frame.

In some examples, to update only the first parameter, video encoder 20 may update only the first parameter based on a weighted average of a previous value of the first parameter and a newly determined value for the first parameter. In some examples, the selected coding mode is a first coding mode included in a plurality of coding modes that are available for encoding the frame, and to select the coding mode, video encoder 20 may perform rate estimation for each block in the frame with respect to each respective coding mode of the plurality, based on respective applications of the rate estimation model, to obtain a respective rate distortion cost corresponding to each respective coding mode of the plurality, and identify, as an optimal coding mode for the frame, the selected coding mode associated with the lowest respective rate distortion cost of the respective rate distortion costs obtained by performing the rate estimations. In some examples, video encoder 20 may encode the frame according to the identified optimal coding mode, the method further comprising zeroing out one or more blocks of the frame to form one or more zeroed-out blocks. In some examples, to zero out the one or more blocks of the frame, video encoder 20 may set all transform coefficients of each of the one or more zeroed-out blocks to a respective zero value.

Figure 9:
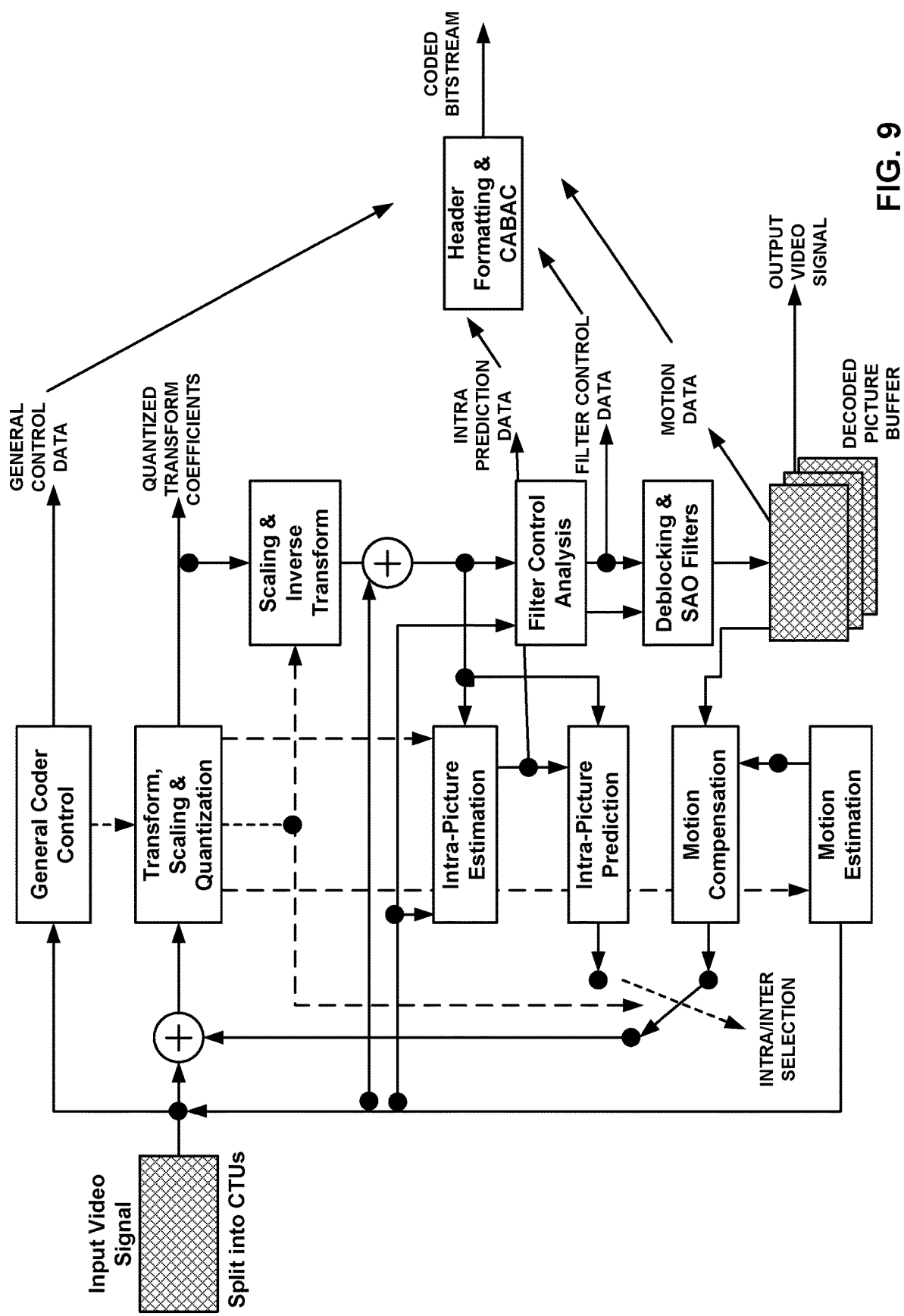
FIG. 9 is a block diagram illustrating an example video encoder that may implement the techniques described in this disclosure.

FIG. 9 is a block diagram illustrating an example video encoder that may implement the techniques described in this disclosure. For example, processing circuitry of the video encoder illustrated in FIG. 9 (and/or processing circuitry of one or more components thereof) may implement various techniques described above.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:
- estimating, based on a combination of a first parameter and a number of non-zero coefficients in a frame, a number of bits for non-zero coefficients of the frame, wherein the first parameter is of a set of parameters for forming a rate estimation model, the set of parameters comprising the first parameter and a second parameter;
- encoding the frame based on the estimated number of bits for the non-zero coefficients of the frame;
- collecting an actual number of bits used to encode the non-zero coefficients of the frame;
- collecting an actual number of the non-zero coefficients in the frame;
- updating, based on the actual number of bits used to encode the non-zero coefficients of the frame and the actual number of non-zero coefficients in the frame, only the first parameter of the set of parameters to form an updated first parameter;
- forming the rate estimation model using the updated first parameter and the second parameter; and
- selecting, based on the rate estimation model, a coding mode for each block in the frame, wherein the selected coding mode is a first coding mode of a plurality of coding modes that are available for encoding the frame, and wherein selecting the coding mode comprises:
  - performing rate estimation for a plurality of blocks in the frame with respect to each respective coding mode of the plurality of coding modes, based on respective applications of the rate estimation model, to obtain a respective rate distortion cost corresponding to each respective coding mode of the plurality of coding modes; and
  - identifying, as an optimal coding mode for the frame, the selected coding mode associated with the lowest respective rate distortion cost of the respective rate distortion costs obtained by performing the rate estimations.

2. The method of claim 1, further comprising determining the actual number of bits used to encode the non-zero coefficients of the frame based on a multiplication product of the updated first parameter and the number of non-zero coefficients in the frame.

3. The method of claim 2, wherein determining the actual number of bits used to encode the non-zero coefficients of the frame further comprises adding the second parameter to the multiplication product.

4. The method of claim 1, wherein estimating the number of bits used for the non-zero coefficients of the frame comprises estimating the number of bits used for the non-zero coefficients of the frame further based on respective positions of one or more of the non-zero coefficients in the frame.

5. The method of claim 1, wherein updating only the first parameter comprises updating only the first parameter based on a weighted average of a previous value of the first parameter and a newly determined value for the first parameter.

6. The method of claim 5, wherein updating only the first parameter comprises:
- determining sum values $S\_xy_i$, $S\_x_i$, and $S\_x2_i$, where $$S\_xy = \Sigma nnz_i \cdot R_{coef,i}$$

$$S\_x = \Sigma nnz_i$$

$$S\_x2 = \Sigma nnz_i^2$$

where x and nnz correspond to the actual number of the non-zero coefficients in block i of the frame,
where y and $R_{coef}$ correspond to the estimated number of bits used for the non-zero coefficients of block i of the frame,
where i corresponds to the block; and
wherein determining the new value for the first parameter comprises determining the new value for the first parameter according to the formula $$a = \frac{S\_xy - b \cdot S\_x}{S\_x2}.$$

7. The method of claim 1, further comprising encoding the frame according to the identified optimal coding mode, the method further comprising zeroing out one or more blocks of the frame to form one or more zeroed-out blocks.

8. The method of claim 7, wherein zeroing out the one or more blocks of the frame comprises setting all transform coefficients of each of the one or more zeroed-out blocks to a respective zero value.

9. A video encoding device comprising:
- a video data memory configured to store a frame of video data; and
- processing circuitry in communication with the video data memory, the processing circuitry being configured to:
  - estimate, based on a combination of a first parameter and a number of non-zero coefficients in the frame stored to the video data memory, a number of bits for non-zero coefficients of the frame, wherein the first parameter is of a set of parameters for forming a rate estimation model, the set of parameters comprising the first parameter and a second parameter;
  - encode the frame based on the estimated number of bits for the non-zero coefficients of the frame;
  - collect an actual number of bits used to encode the non-zero coefficients of the frame;
  - collect an actual number of the non-zero coefficients in the frame;
  - update, based on the actual number of bits used to encode the non-zero coefficients of the frame and the actual number of non-zero coefficients in the frame, only the first parameter of the set of parameters to form an updated first parameter;
  - form the rate estimation model using the updated first parameter and the second parameter; and
  - select, based on the rate estimation model, a coding mode for each block in the frame, wherein the selected coding mode is a first coding mode of a plurality of coding modes that are available for encoding the frame, and wherein to select the coding mode comprises:
    - performing rate estimation for a plurality of blocks in the frame with respect to each respective coding mode of the plurality of coding modes, based on respective applications of the rate estimation model, to obtain a respective rate distortion cost corresponding to each respective coding mode of the plurality of coding modes; and
    - identifying, as an optimal coding mode for the frame, the selected coding mode associated with the lowest respective rate distortion cost of the respective rate distortion costs obtained by performing the rate estimations.

10. The video encoding device of claim 9, wherein the processing circuitry is further configured to determine the actual number of bits used to encode the non-zero coefficients of the frame based on a multiplication product of the updated first parameter and the number of non-zero coefficients in the frame.

11. The video encoding device of claim 10, wherein to determine the actual number of bits used to encode the non-zero coefficients of the frame, the processing circuitry is further configured to add the second parameter to the multiplication product.

12. The video encoding device of claim 9, wherein to estimate the number of bits used for the non-zero coefficients of the frame, the processing circuitry is configured to estimate the number of bits used for the non-zero coefficients of the frame further based on respective positions of one or more of the non-zero coefficients in the frame.

13. The video encoding device of claim 9, wherein to update only the first parameter, the processing circuitry is further configured to update only the first parameter based on a weighted average of a previous value of the first parameter and a newly determined value for the first parameter.

14. The video encoding device of claim 13, wherein to update only the first parameter, the processing circuitry is further configured to:
determining sum values $S\_xy_i$, $S\_x_i$, and $S\_x2_i$, where $$S\_xy = \Sigma nnz_i \cdot R_{coef,i}$$

$$S\_x = \Sigma nnz_i$$

$$S\_x2 = \Sigma nnz_i^2$$

where x and nnz correspond to the actual number of the non-zero coefficients in block i of the frame,
where y and $R_{coef}$ correspond to the estimated number of bits used for the non-zero coefficients of block i of the frame,
where i corresponds to the block; and
wherein determining the new value for the first parameter comprises determining the new value for the first parameter according to the formula $$a = \frac{S\_xy - b \cdot S\_x}{S\_x2}.$$

15. The video encoding device of claim 9, wherein the processing circuitry is further configured to encode the frame according to the identified optimal coding mode, and zero out one or more blocks of the frame to form one or more zeroed-out blocks.

16. The video encoding device of claim 15, wherein zeroing out the one or more blocks of the frame comprises setting all transform coefficients of each of the one or more zeroed-out blocks to a respective zero value.

17. An apparatus for of encoding video data, the apparatus comprising:
means for estimating, based on a combination of a first parameter and a number of non-zero coefficients in a frame, a number of bits for non-zero coefficients of the frame, wherein the first parameter is of a set of parameters for forming a rate estimation model, the set of parameters comprising the first parameter and a second parameter;

means for encoding the frame based on the estimated number of bits for the non-zero coefficients of the frame;
means for collecting an actual number of bits used to encode the non-zero coefficients of the frame;
means for collecting an actual number of the non-zero coefficients in the frame;
means for updating, based on the actual number of bits used to encode the non-zero coefficients of the frame and the actual number of non-zero coefficients in the frame, only the first parameter of the set of parameters to form an updated first parameter;
means for forming the rate estimation model using the updated first parameter and the second parameter; and
means for selecting, based on the rate estimation model, a coding mode for each block in the frame, wherein the selected coding mode is a first coding mode of a plurality of coding modes that are available for encoding the frame, and wherein the means for selecting the coding mode comprises:
means for performing rate estimation for a plurality of blocks in the frame with respect to each respective coding mode of the plurality of coding modes, based on respective applications of the rate estimation model, to obtain a respective rate distortion cost corresponding to each respective coding mode of the plurality of coding modes; and
means for identifying, as an optimal coding mode for the frame, the selected coding mode associated with the lowest respective rate distortion cost of the respective rate distortion costs obtained by performing the rate estimations.

18. A non-transitory computer-readable storage medium encoded with instructions that, when executed, cause one or more processors of a video encoding device to:
estimate, based on a combination of a first parameter and a number of non-zero coefficients in a frame of video data, a number of bits for non-zero coefficients of the frame wherein the first parameter is of a set of parameters for forming a rate estimation model, the set of parameters comprising the first parameter and a second parameter;
encode the frame based on the estimated number of bits for the non-zero coefficients of the frame;
collect an actual number of bits used to encode the non-zero coefficients of the frame;
collect an actual number of the non-zero coefficients in the frame;
update, based on the actual number of bits used to encode the non-zero coefficients of the frame and the actual number of non-zero coefficients in the frame, only the first parameter of the set of parameters to form an updated first parameter;
form the rate estimation model using the updated first parameter and the second parameter; and
select, based on the rate estimation model, a coding mode for each block in the frame, wherein the selected coding mode is a first coding mode of a plurality of coding modes that are available for encoding the frame, and wherein to select the coding mode comprises:
performing rate estimation for a plurality of blocks in the frame with respect to each respective coding mode of the plurality of coding modes, based on respective applications of the rate estimation model, to obtain a respective rate distortion cost corresponding to each respective coding mode of the plurality of coding modes; and identifying, as an optimal coding mode for the frame, the selected coding mode associated with the lowest respective rate distortion cost of the respective rate distortion costs obtained by performing the rate estimations.

* * * * *